Oct. 30, 1962  F. LEMBO  3,060,995
APPARATUS FOR CONTINUOUSLY MANUFACTURING
PLASTIC LAMINATED TEXTILE FILMS
Filed Jan. 28, 1958  4 Sheets-Sheet 1
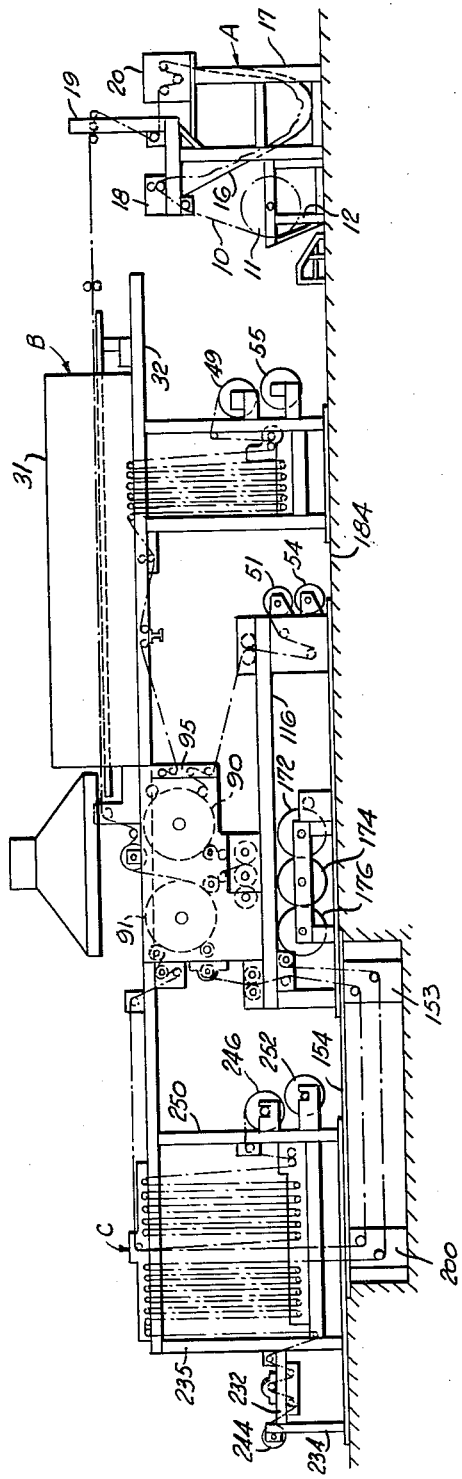
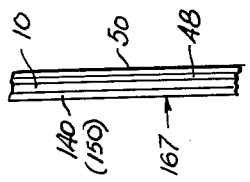
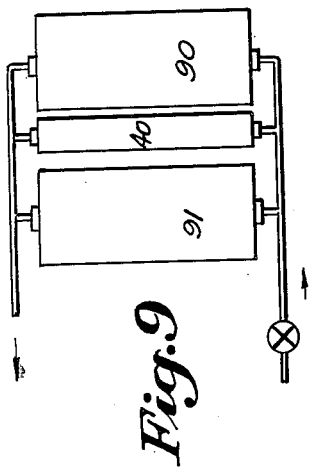
INVENTOR.
FRANK LEMBO
BY
Richards & Geier
ATTORNEYS

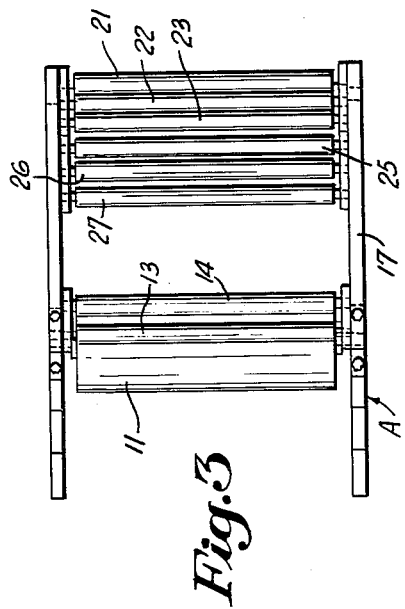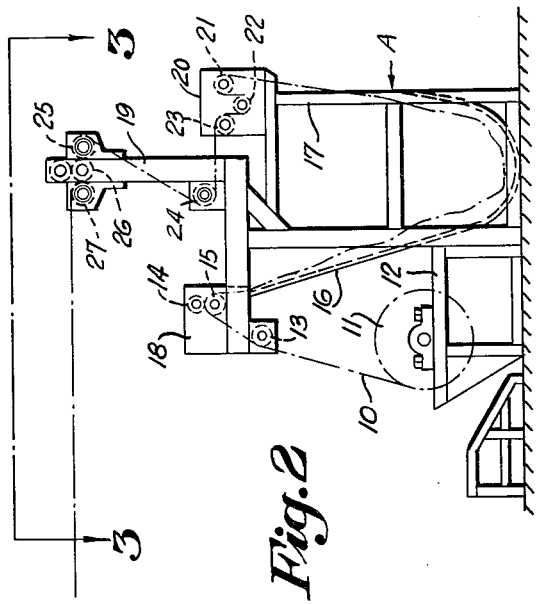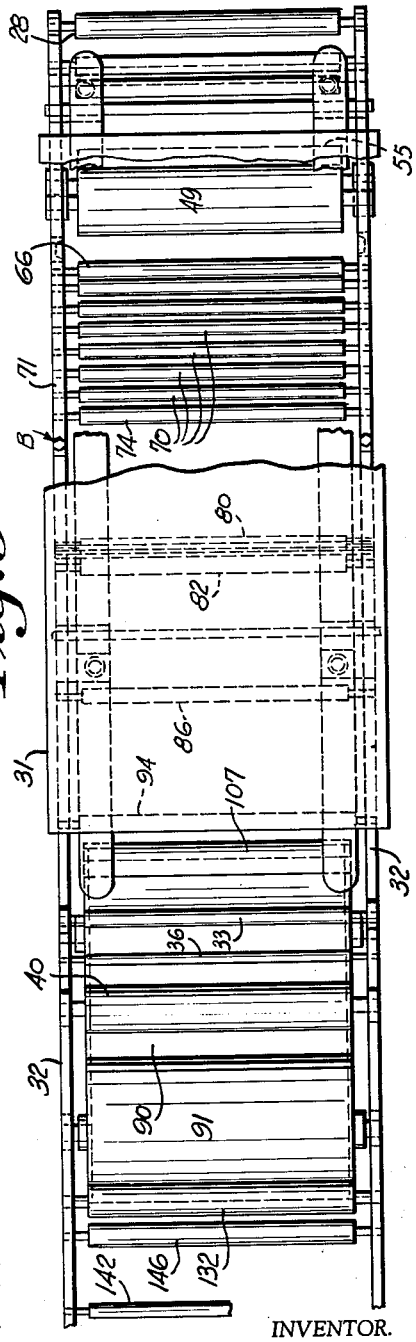

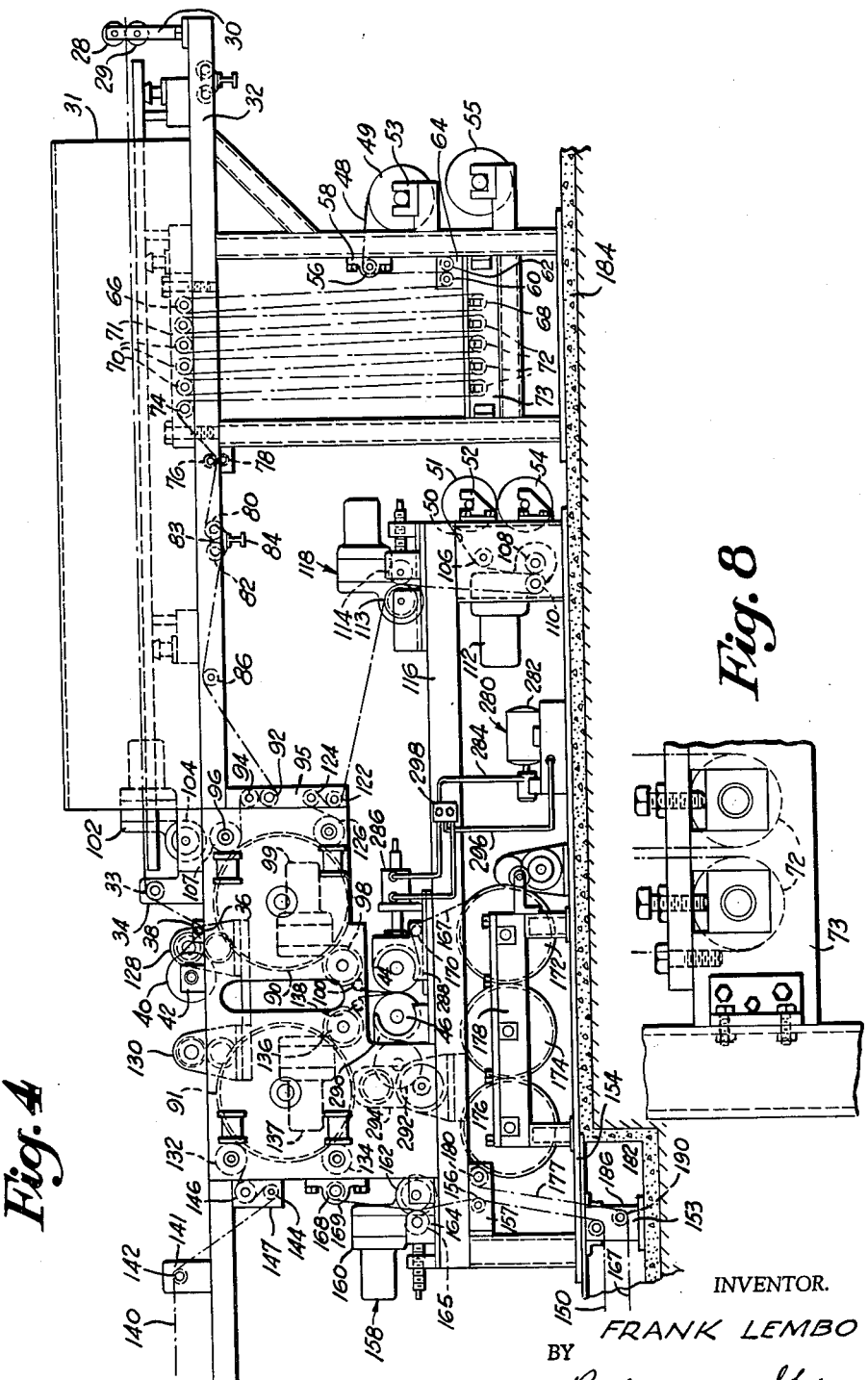

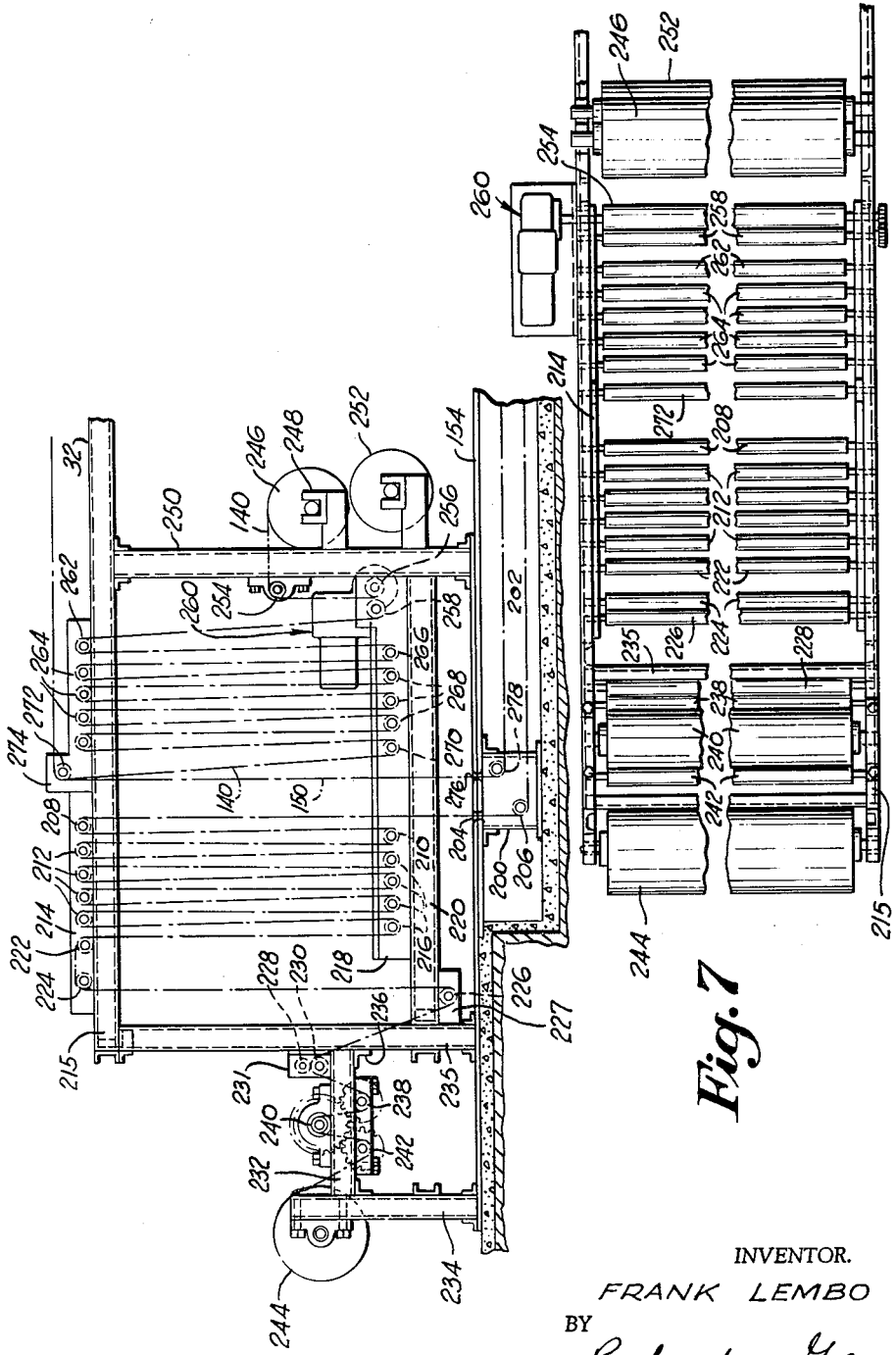

3,060,995
APPARATUS FOR CONTINUOUSLY MANUFAC-
TURING PLASTIC LAMINATED TEXTILE FILMS
Frank Lembo, 248 E. 17th St., Paterson 4, N.J.
Filed Jan. 28, 1958, Ser. No. 711,700
3 Claims. (Cl. 156—498)

This invention relates to a laminating and embossing apparatus and refers more particularly to an apparatus for continuously manufacturing plastic laminated textile films, fabrics, and fabric substitutes.

While the present-day development of the laminating art provides facilities for producing a plastic laminated textile film, it has increased the ultimate cost of the finished product, since additional multiple operations for printing and embossing the film are involved.

Consequently, it is an object of the present invention to provide an efficiently operating and comparatively inexpensive apparatus for laminating webs of plastic and textile material to each other in one continuous operation while simultaneously embossing and printing the film to form a finished laminated product.

Still another object of the present invention is to provide a greater degree of efficiency in heating each textile and plastic web uniformly by continuously applying a uniform temperature to the webs before they reach the lamination point.

A further object is to provide means which heat the webs of textile and plastic materials by conduction, so that heating of the webs to a degree sufficient to fuse the plastic webs with the textile web is effected within a relatively short length of travel of the webs between the pressure and laminating rollers prior to lamination.

Other objects of the present invention will become apparent in the course of the following specification.

In the attainment of the aforesaid and other objectives, the inventive concept of the present invention may be realized through the provision of a single apparatus which may be formed of a framework supported and reinforced by support members carrying a plurality of various types of rollers and heated drums which cause webs of textile and plastic material to move continuously thereover toward a lamination point while the webs are being simultaneously embossed and printed. For illustrative purposes, the apparatus may be constituted of three sections, namely, a textile web unraveling section which supplies and prepares a textile web from a textile supply roll to a plurality of rollers, a laminating section and chamber which is the section disposed in the middle of the apparatus or adjacent the textile web unraveling section and wherein the lamination of the textile and plastic webs takes place, and a finishing section which is disposed adjacent the lamination section and chamber or at the opposite end of the apparatus and wherein the finished laminated film is continuously wound upon a pick-up roll.

The method which may be carried out by the apparatus of the present invention and the articles produced thereby are described in greater detail in my co-pending patent application Serial No. 615,682, filed October 12, 1956, now abandoned.

A fuller understanding of the present invention may be had by referring to the following description taken in conjunction with the accompanying drawings, showing by way of example only, a preferred embodiment of the inventive idea.

In the drawing:

FIGURE 1 is a side view showing the apparatus of the present invention as a whole.

FIGURE 2 is a side elevational view showing on a larger scale the textile web unraveling section.

FIGURE 3 is a plan view showing the textile web unraveling section of FIGURE 2.

FIGURE 4 is a side elevational view showing the laminating section and chamber of the apparatus.

FIGURE 4a is an enlarged view of a portion of the section shown in FIG. 4.

FIGURE 5 is a plan view showing the laminating section and chamber of FIGURE 4.

FIGURE 6 is a side elevational view showing the finishing section of the apparatus.

FIGURE 6a is similar to FIG. 6 and illustrates a different path for a plastic web.

FIGURE 7 is a plan view showing the finishing section of FIGURE 6.

FIGURE 8 is a fragmentary section showing one form of the bearing mounts for one of the type rollers.

FIGURE 9 illustrates the steam pipe connections.

FIGURE 10 is a diagram showing a laminated fabric.

The apparatus of the present invention is comprised of three sections, namely, a textile web unraveling section A, a laminating section and chamber B, and a finishing section C.

The textile web unraveling section A is provided with a plurality of rollers and related structural supports for feeding the textile fabric initially into the laminating section and chamber B. The lamination section and chamber B is provided with a tenterette unit for removing the moisture from the textile fabric as it enters from the textile web unraveling section A. Supply rolls of plastic material as well as a coating unit and a plurality of rollers are disposed at one end of the lamination section, while heated chrome-plated drums, lamination rollers and cooling cylinders are provided in the lamination chamber. The finished laminate is rolled and wound into a finishing roll in the finishing section C which is also provided with supply rolls containing plastic material as well as a coating unit and a plurality of various types of feeding, tensioning, idling, and guiding rollers.

*Textile Web Unraveling Section A (FIGS. 2 and 3)*

A textile supply roll is rotatably mounted at both its ends on a platform 12. A guiding roller 13, an idling roller 14, and a feed roller 15 are rotatably disposed near one end of a U-shaped trough 16 which is firmly secured to a frame structure 17. A vertical support structure 18 provides the means for rotatably mounting the idling roller 14, and the feed roller 15. At the opposite end of the frame structure 17 another vertical support 20 provides the means for rotatably mounting an idling roller 21, a tensioning roller 22, and a feed roller 23. Positioned intermediate the vertical support structures 18 and 20 is another vertical support structure 19 which provides the means for rotatably mounting a guiding roller 24, a roller 25, a tensioning roller 26, and a feed roller 27.

*Laminating Section and Chamber B (FIGS. 4 and 5)*

The laminating section B comprises a guide roller 28 and a guide roller 29 which are rotatably mounted on a vertical support structure 30. A tenterette unit 31 is firmly connected to and disposed atop of the upper framework structure 32.

The framework structure 32 of the laminating section B is made of structural steel and is provided with vertical supports and reinforced cross-members which are welded or bolted to each other.

A guiding roller 33 is rotatably mounted upon a stationary vertical support structure 34 and another guiding roller 36 is rotatably mounted upon a stationary support structure 38, at the end of the tenterette unit 31.

A chrome-plated drum 40 is rotatably mounted upon and carried by a support structure 42 which is firmly secured to the upper portion of the framework 32.

The tenterette unit 31 is a combined drying and curing chamber enclosed by a heat insulating asbestos casing (not shown). Within the unit 31, the endless textile web 10 passes over a steam heated platform (not shown) which is provided with a plurality of steam pipe connections and which removes excess moisture from the textile web as it moves ahead toward the heated chrome-plated drum 40.

A web of plastic material 48 and another web of plastic material 50 are unrolled from supply rolls 49 and 51, respectively, prior to laminating the textile web 10 by passing it between a laminating roller 44 and a laminating roller 46. The supply rolls 49 and 51 are rotatably and removably mounted in vertical support members 52 and 53, respectively. Auxiliary put-on rolls 54 and 55 are held in reserve in a similar manner within close proximity of the supply rolls 49 and 51, respectively.

A guide roller 56 is rotatably mounted on and carried by a vertical support 58, and feed rollers 60 and 62 are rotatably mounted on and carried by a support structure 64.

A plurality of compensator rollers 66, 70, and 74 are disposed along the upper portion of the framework structure 32 and a plurality of lower compensator rollers 68 and 72 are disposed along the lower portion of the framework structure 32.

The upper compensator rollers 66, 70, and 74 are rotatably mounted on a support member 71, while the lower compensator rollers 68 and 72 are rotatably and removably mounted on a horizontal cross-member 73 (FIGURE 8).

Feed rollers 76 and 78 are disposed adjacent the upper compensator rollers 66, 70 and 74; they enable the plastic web 48 to be drawn taut as it moves from the upper compensator roller 74 toward the lamination chamber.

Guide rollers 80 and 82 are rotatably supported by a guide plate 83 mounted along the path of travel of the plastic web 48 in the framework structure 32.

Another guide roller 86 is carried by the framework structure 32 and is mounted a short distance from the guide plate 83; the roller 86 aids to maintain the web 48 in a tensioned condition.

Thus it is apparent from this construction that the movement of the web 48 is perfectly aligned with the contacting rollers before it enters the lamination chamber.

In the lamination chamber two heated chrome-plated drums 90 and 91 are provided, which are rotatably mounted and firmly supported by the side walls of the framework structure 32.

Feed rollers 92 and 94 are rotatably mounted one above the other and carried by the vertical support portion 95 disposed adjacent the lamination chamber. In the lamination chamber, another pressure roller 96 is rotatably mounted and carried by the side walls of the framework structure 32. The pressure roller 96 is adapted to rotate in synchrony with the heated chrome-plated drum 90, as the plastic web 48 passes rapidly over the circumferential surfaces of rollers 96 and the drum 90. The drum 90 heats the plastic web 48 to a pliable and flexible condition which is sufficient to effect proper lamination of the web 48 to the textile web 10.

A motor 102 is mounted along one side wall of the framework structure 32 and is provided with a shaft driven spur gear 104 which meshes with another spur gear 107 disposed at one end of pressure roller 96.

Another plastic web 50 is unwound from a supply roll 51 which is disposed in the laminating section B. Unwinding of the plastic web 50 is aided by means of a motor driven shaft the spur gear 108 of which meshes with another spur gear (not shown) disposed at one end of feed roller 110.

A coating unit comprising essentially a roller 113 and another pressure roller 114, is provided at one end of a support structure 116 and is driven by a motor 118. The pressure of the roller 114 applied against the roller 113 is adjustable by means of a screw-type shaft diagrammatically shown by reference numeral 120.

Feed rollers 122 and 124 are rotatably and contiguously disposed upon the vertical support portion 95. A pressure roller 126 provided in the lamination chamber, rotates contiguously with drum 90 and aids in layering the plastic web 50 upon the circumferential surfaces of the heated chrome-plated drum 90. The drums 90 and 91 are driven by motors 128 and 130, respectively. The speed of each drum 90 and 91 is variable and controlled by adjusting the gear ratio of the respective motors 128 and 130 or by means of a master control switch operated from a selector panel board (not shown).

Along the circumferential surfaces, the heated chrome-plated drum 91 is provided with two pressure rollers 132 and 134 disposed at given points within the lamination chamber.

The pressure rollers 132 and 134 provided in the lamination chamber rotate contiguously with drum 91 and aid in layering a plastic web 140 or 150 upon the circumferential surfaces of the heated chrome-plated drum 91. Similarly, two strip-off rollers 136 and 138 are rotatably mounted within the lamination chamber and aid in removing the plastic webs from the heated chrome-plated drum 91. A motor 137 is connected in the usual manner (not shown) with the strip-off roller 136.

Similarly, two strip-off rollers 98 and 100 are rotatably mounted within the lamination chamber opposite strip-off rollers 136 and 138. A motor 99 is operatively connected with the strip-off roller 98 and operates in a manner similar to that of motor 137.

A tensioning roller 142 and feed rollers 144 and 146 are rotatably mounted upon vertical support members 141 and 147, respectively.

As will be described in detail hereinafter, the plastic web 140 may move in one of two different directions. Whenever the web is directed to move over the top side of roller 272 (FIGURE 6) of the finishing section C, it is designated by the numeral 150.

An entablement 154 is disposed at the lower right-hand level of the laminating section and chamber B.

Underneath the entablement 154 a guiding roller 152 is rotatably mounted and carried by a vertical base support 153. A tension roller 156 is rotatably mounted and carried by a reinforced member 157 disposed underneath the support frame 116.

On the uppermost surfaces of the support frame 116 is firmly secured a coating unit 158 which is adapted to coat, print or emboss the web 150 as desired. The unit 158 comprises a motor 160 provided with a driven shaft (not shown) connected to a detachable roller 162.

Contiguous with roller 162 is a pressure roller 164 rotatably mounted upon a vertical support 165 carried by the structural support frame 116. The pressure roller 164 is adjustably mounted by means of a screw-driven shaft 166 and aids in calendering the plastic web 150 as it passes through the coating unit 158.

A tensioning roller 168 is rotatably mounted upon a stationary support 169 adjacent the lamination chamber.

As the bonded plastic webs 48, 50 and 140 or 150 pass with the textile web 10 between the lamination rollers 44 and 46, they are completely fused together to such an extent that their layers become inseparable. The fused webs produce a laminated film 167 which is removed from the circumferential surfaces of laminating roller 44 by means of a strip-off roller 170.

A supercalendered arrangement includes three cooling drums 172, 174 and 176 which are rotatably mounted on a structural support 178.

The cooling drums 172, 174, 176 are provided with a continuous supply of water which is maintained at a given temperature and which is circulated through the drums by means of suitable pipe connections in a known manner (not shown).

A strip-off roller 180 frees the laminate 167 from the cooling drum 176. The laminate 167 passes through an opening 177 of the entablement 154 underneath which is a pit 182 constructed so as to allow the plastic web 150 to enter the laminating section B or to allow the laminate 167 to enter the finishing section C.

One end of the pit 182 is provided with a vertical base member 186 which supports the entablement 154. A guiding roller 190 is rotatably mounted and carried by the support 186.

Finishing Section C

Referring now to the finishing section C of the apparatus shown in FIGURES 6 and 7 of the drawings, another vertical base member 200 supports the opposite side of the entablement 154 which is provided with another opening 204 through which the finished laminate 167 passes. A guiding roller 206 is rotatably mounted on and carried by the base member 200.

A plurality of compensator rollers 208, 212 are provided along the upper part of the framework structure 32, while another similar series of compensator rollers 210, 216 is disposed along the lower part of the framework structure 32. The compensator rollers 208, 212 and 210, 216 rotate in synchrony with each other whenever the finished laminate 167 is passed alternately between each roller of each series. This arrangement aids the laminate 167 to be uniformly wound upon the pick-up roll 244. The upper compensator rollers 208, 212 are spaced at a given distance from each other and are rotatably mounted and carried by the frame support 214 which is connected to the reinforced cross-piece 215 of the structural framework 32. Similarly, the lower compensator rollers 210, 216 are spaced at a given distance from each other and are rotatably mounted and carried by the frame support 218 which is firmly secured to the reinforced cross-piece 220.

Guiding rollers 222 and 224 are provided at the extreme left side of the structure 214 (looking in the direction of FIGURE 6). A tensioning roller 226 is rotatably mounted upon the structure 227 positioned below the support 220. An idling roller 228 and a feed roller 230 are rotatably mounted and carried by a support 231 which is secured to a cross-beam 232 disposed between two vertical supports 234 and 235. The cross-beam 232 is supported at a predetermined distance from the ground level 184 by means of angle members 236.

Tensioning rollers 238, 240 and 242 are disposed intermediate the support 232 and are provided with gear drives. The rollers 238, 240 and 242 are mounted intermediate the vertical supports 234 and 235 and have intermeshing spur gears (not shown) mounted at one side of each roller. A pick-up roller 244 is rotatable mounted on a vertical support 234 and is removably disposed, so that another pick-up roll may be readily placed into the same position as occupied by roller 244 whenever necessary.

In the finishing section C, the plastic web 140 is unrolled from a supply roll 246 which is rotatably mounted on a U-shaped member 248 secured to the vertical support 250. Another auxiliary supply roll 252 is similarly positioned adjacent to and below the supply roll 246.

As the plastic web 140 is unrolled it passes over guiding roller 254 which is also positioned on the vertical support 250. Feed rollers 256 and 258 rotatably disposed on the structure 218 are driven by means of a motor 260 which is provided with a shaft having spur gears at one end thereof (not shown) meshing with another spur gear secured to one end of roller 256.

Between the vertical support beams 235 and 250 another duplicate set of supercompensator rollers is carried by the cross-beams 214 and 218, respectively. Each of the sets comprises a series of upper compensator rollers 262, 264 and a series of lower compensator rollers 266, 268, and 270. The plastic web 140 passes alternatively between each roller of each series of the upper and lower compensator rollers 262, 264, and 266, 268, and 270, respectively.

A guiding roller 272 is rotatably mounted on a vertical support 274 which extends upwardly from the horizontal support structure 214 intermediate its ends. The guiding roller 272 is rotated either clockwise or counterclockwise (looking in the direction of FIGURE 2) dependent upon the direction of movement of the web 140.

An opening 276 is provided in the entablement 154 to allow the web 150 to enter the pit 182. A guiding roller 278 is rotatably monuted on the vertical base member 200 to allow the web 150 to pass from the finishing section C to the lamination section and chamber B shown in FIGURE 4.

As the plastic webs 48, 50 and 140 or 150 and textile web 10 are heated and approach the nips of laminating rollers 44 and 46, compression of the webs is effected by means of hydraulic power which is indicated diagrammatically at 280 in FIGURE 4. A motor 282 provides the pressure fluid within the system through feed supply conduit 284 to a hydraulic cylinder 286 which exerts a force against a yoke housing 288. The semi-circular yoke housing 288 bears against the central axis of the laminating roller 44 which in turn rotates contiguously with the oppositely disposed laminating roller 46. The laminating roller 46 is held in a stationary position by means of another yoke housing 290 which is firmly secured to the support structure 116. A pressure roller 292 rotatably mounted on the side walls of the framework 32 applies a force against one side of laminating roller 46 and is driven by means of a motor 294 at a speed equal to the speed of rotation of the laminating roller 44. A discharge supply conduit 296 is operatively connected from the hydraulic cylinder 286 with the hydraulic source 280. The hydraulic cylinder 286 simultaneously receives fluid under pressure to one side of the cylinder through supply conduit 284, the fluid being subsequently returned through discharge conduit 296. A valve arrangement 298 is provided to time the operation of the hydraulic cylinder 286.

It will be evident from this construction that the hydraulic cylinder 286 operates both laminating rollers 44 and 46 simultaneously and at the same speed. It will also be noted that the pressure applied to the central axis at opposite ends of the laminating roller 44 is equalized to effect a uniform lamination of the textile and plastic webs.

The drive of the various feed rollers has not been illustrated herein since it is of standard type and does not constitute the subject of the present invention.

Operation

Referring to FIGURES 1 and 2 of the drawings, a web of textile material 10 is fed in the textile web unraveling section A from supply roll 11 over one side of the guiding roller 13, between idling roller 14 and feed roller 15, and then downwardly over one side of feed roller 15. The forward end of the textile web 10, as it moves ahead is freed of wrinkles by passing it downwardly along one side of the U-shaped trough 16 and then upwardly against another opposite side of the trough 16. The textile web 10 then passes over one side of the idling roller 21, downwardly against the under side of the tensioning roller 22, and over one side of the feed roller 23. The web passes against the under side of guiding roller 24, upwardly to one side of roller 25, and then between tensioning roller 26 and feed roller 27.

The textile web 10 then passes into laminating section B (FIG. 4) between guide roller 28 and guide roller 29 and moves into the tenterette unit 31. The web is kept taut as it passes through the heat insulated unit 31 between the rollers 28, 29, and 33. In the tenterette unit 31 the web 10 passes over a steam heated platform which is provided with steam pipes and which removes excess moisture from the web. As the textile web 10 leaves the tenterette unit 31 it is fed over the stationary roller 33 and then downwardly against the under side of stationary roller 36. This latter roller 36 holds the textile web 10 taut to inspire a positive feed to the lamination point and to prevent the material from slipping.

The textile web 10 passes over the heated chrome-plated drum 40 and at this point the web is directly over the nips of the laminating rollers 44 and 46 (FIG. 4a).

Prior to laminating and before passing between laminating rollers 44 and 46, the web 10 is combined with a web of plastic material 48 and another web of plastic material 50 which are unrolled from supply rolls 49 and 51, respectively.

The plastic web 48 passes over one side of the guide roller 56 and then passes directly downwardly between feed rollers 60 and 62.

As the plastic web 48 moves against one side of feed roller 60 it is fed vertically upward against the top side of the compensator roller 66, then vertically downward against the under side of another compensator roller 68 and then up and down between the compensator rollers 71, 72 and 70. The double compensator roller arrangement causes the plastic web 48 to become taut and free of wrinkles as it moves ahead alternately over the upper and lower series of compensator rollers.

Then the plastic web 48 passes over one side of the guide roller 74 and between feed rollers 76 and 78 and moves over a pair of guide rollers 80 and 82; it is drawn increasingly taut during this movement. The movement of the web 48 through the upper and lower compensator roller arrangement automatically controls the speed of the compensator rollers and the web 48 therefore is perfectly aligned before engaging the heated chrome-plated drum 90.

The plastic web 48 as it moves forward on its way toward the heated drum 90 passes over guide rollers 80, 82 and 86 and then passes between stationary feed rollers 92 and 94. The pressure roller 96 firmly presses the plastic web 48 against the heated outer peripheral surfaces of the drum 90 and as the plastic web 48 passes rapidly over one-half the circumferential distance of drum 90, it is heated uniformly to a pliable and flexible condition sufficient to effect subsequently proper lamination of the plastic web 48 to the textile web 10.

Concurrently another plastic web 50 leaves supply roll 51 from another location in the laminating section B and moves forward over one side of the tensioning roller 106 and then downwardly between feed rollers 108 and 110. The plastic web 50 then passes against the under side of the feed roller 110 and between the tensioning roller 113 and pressure roller 114.

As the plastic web 50 moves toward the heated drum 90, it passes between feed rollers 122 and 124 and then passes against the under side of pressure roller 126 which firmly layers the plastic web 50 upon the circumferential surfaces of the heated drum 90. As the heated drum 90 rotates counterclockwise (looking in the direction of FIGURE 4), the plastic web 50 merges with the plastic web 48 at approximately one-fourth of the circumferential distance of drum 90, at which point both webs 48 and 50 are pressed firmly to each other. The bonded plastic webs 48 and 50 are further heated uniformly as they travel over one-half of the drum's circumference which is stripped free of the bonded webs 48 and 50 at a given point by strip-off rollers 98 and 100 prior to reaching the point of lamination. At this instance, the bonded plastic webs 48 and 50 are positioned directly above the nips of the lamination rollers 44 and 46 where they merge with the textile web 10 prior to lamination.

A plastic web 140 enters the laminating section B from the finishing section C. As shown in FIG. 6, the plastic web 140 is unrolled from the supply roll 246. As the plastic web 140 is unrolled it passes over the guide roller 254 and then it passes directly downward between feed rollers 256 and 258, and finally upward against the under side of roller 258.

The plastic web 140 passes successively in an up and down fashion alternating between the upper and lower compensator rollers 262, 264, and 266, 268, and 270 respectively.

The plastic web 140 may be moved from that point in two different directions, one of which is designated by the same numeral 140, while the other is designated by the numeral 150.

When the plastic web is directed diagonally upward from the lower compensator roller 270 to one side of guiding roller 272, then the web 140 causes the guiding roller 272 to move in a clockwise direction and consequently passes into the laminating section B along the uppermost part of the framework structure. As shown in FIGURE 4, the web 140 passes over the tensioning roller 142 and moves against the under side of feed roller 144, and over the upper side of feed roller 146. The plastic web 140 then passes rapidly underneath the pressure roller 132 and is heated uniformly to a given temperature as it is layered onto the chrome-plated drum 91.

As already stated, the plastic web 140, if desired, may be directed through another route in which instance it is designated by reference numeral 150. Whenever the plastic web is directed vertically upward from the lower compensator roller 270 (FIG. 6a) to the opposite side of guiding roller 272, then the plastic web causes the guiding roller 272 to move in a counterclockwise direction and consequently passes into the bed portion 182 through the opening 276 in the entablement 154. As the plastic web 150 moves ahead it passes against the under side of another guiding roller 278. From the bed portion 182 the plastic web 150 passes from the finishing section C into the bed portion 182 of the laminating section B shown in FIGURE 4. The plastic web 150 passes over the guiding roller 152 and upwardly over one side of tensioning roller 156. The plastic web 150 passes upwardly between roller 162 and the pressure roller 164 and as the plastic web 150 moves toward the heated drum 91 it passes over one side of the tensioning roller 168. When the web 150 leaves the tensioning roller 168 it enters the lamination chamber by passing against the under side of the pressure roller 134 which presses the web against the circumferential surfaces of drum 91.

The plastic web 140 or 150 is freed from the circumferential surfaces of drum 91 by means of strip-off rollers 136 and 138 at which point the web 140 or 150 merges with the other opposite side of the textile web 10 directly above the nips of the lamination rollers 44 and 46. As the plastic webs 48, 50 and 140 or 150 and textile web 10 are heated and approach the lamination point, the laminating rollers 44 and 46 are forced toward each other hydraulically and the final compression of the webs is effected. As the bonded plastic webs 48, 50 and 140 or 150 pass with the textile web 10 between lamination rollers 44 and 46, they are completely fused together to such extent that their layers become inseparable.

The fused laminate which is designated by the numeral 167 is directed against the under side of laminating roller 44 before it passes over the guiding roller 170 and over the supercalendered arrangement of three cooling drums or cylinders 172, 174, and 176. The fused laminate 167 passes against the under side of cooling drum 172 and between drum 174 and 172, over the top side of cooling drum 174, between drum 174 and 176, and against the under side of drum 176. The strip-off roller 180 frees the cooling drum 176 of the fused laminate 167 as it passes over the top side of roller 180. After the fused laminate 167 is cooled, it passes downwardly into the bed portion 182 by means of the guiding roller 190. The entablement 154 covers the bed portion 182 to enable the fused laminate 167 to pass into the finishing section C of the apparatus.

Referring now to the finishing section C of the apparatus illustrated in FIGURE 6 of the drawings, the fused laminate 167 passes through an opening 204 in the floor of the entablement 154 and moves vertically upward over the guiding roller 206 to an upper compensator roller 208, and then downwardly against the underside of a lower compensator roller 210.

The fused laminate 167 passes over the upper and lower compensator rollers 212 and 216 alternating in an up and downward fashion therebetween, and it finally moves over the guiding roller 222 and over one side of the guiding roller 224. At this point, the laminate 167 passes directly vertically downward against the under side of the tensioning roller 226 and then upwardly diagonally between the idling roller 228 and the feed roller 230.

Then the fused laminate 167 moves ahead against the under side of the tensioning roller 238, over the upper side of the tensioning roller 240, downwardly against the under side of the guiding roller 242, and then finally it is wound upon the pick-up roller 244.

It will be seen from the foregoing description that an apparatus is provided which accomplishes the objectives hereinabove stated, and which operates in such manner that the textile and plastic webs move toward the lamination point uniformly and rapidly as they are continuously conveyed by the rollers and drums to produce an economical, fused laminated product, such as the fabric 167 shown in FIGURE 10 and composed of the textile web 10, the bonded webs of plastic material 48, 50 and the plastic web 140 or 150.

It will be understood further that the invention is not limited to the exact disclosure herein described but may lend itself to a variety of expressions within the scope of the appended claims.

What is claimed is:

1. In a laminating apparatus, a laminating station comprising two cold-laminating lamination rollers, hydraulic means for pressing said lamination rollers against each other, a smaller heating drum located above said lamination rollers, two spaced opposed larger heating drums located between said smaller heating drum and said lamination rollers, means connected with one of said two larger heating drums for feeding a plastic web to the upper portion of said one larger heating drum, means connected with said one larger heating drum for feeding another plastic web to the lower portion of said one larger heating drum, said two plastic webs being bonded upon said one larger heating drum, means connected with the other larger heating drum for feeding a third plastic web thereto, means feeding a textile web to said smaller heating drum, a plurality of cooling drums located below said lamination rollers, and means feeding said textile web and said plastic webs between said lamination rollers to fuse the webs into a laminate and feeding said laminate to said cooling drums.

2. In a laminating apparatus a laminating station, comprising, two cold-laminating lamination rollers, hydraulic means for pressing said lamination rollers against each other, a smaller heating drum located above said lamination rollers, two spaced opposed larger heating drums located between said smaller heating drum and said lamination rollers, means connected with one of said two larger heating drums for feeding a plastic web thereto, means connected with upper and lower portions of the other larger heating drum for selectively feeding another plastic web to the upper and lower portions of the other larger heating drum, means feeding a textile web to said smaller heating drum, a plurality of cooling drums located below said lamination rollers, and means feeding said textile web and said plastic webs between said lamination rollers to fuse the webs into a laminate and feeding said laminate to said cooling drums.

3. In a laminating apparatus, a laminating station, comprising, two unheated lamination rollers, hydraulic means for pressing said lamination rollers against each other for establishing a nip therebetween, two spaced opposed larger heating drums located above said lamination rollers and disposed symmetrically thereto, a smaller heating drum located above said larger heating drums, means connected with one of said two larger heating drums for feeding a plastic web to the upper portion of said one larger heating drum, means connected with said one larger heating drum for feeding another plastic web to the lower portion of said one larger heating drum, said two plastic webs being bonded together upon said one larger heating drum, means connected with upper and lower portions of the other larger heating drum for feeding another plastic web selectively to one of the upper and lower portions of the said other larger heating drum, cooling drums located below said lamination rollers, means feeding a textile web to said smaller heating drum, means stripping said plastic webs from said larger heating drums, means simultaneously feeding said textile web, the last mentioned plastic web and said two bonded-together plastic webs into the nip of said lamination rollers to fuse the webs into a laminate and causing the last mentioned plastic web and the two bonded-together plastic webs to enter the nip of said lamination rollers at an acute angle with the textile web on opposite sides thereof, and means feeding said laminate to said cooling drums.

References Cited in the file of this patent

UNITED STATES PATENTS

| | | |
|---|---|---|
| 2,219,213 | Swain | Oct. 22, 1940 |
| 2,434,795 | Glasing et al. | Jan. 20, 1948 |
| 2,584,753 | Spooner | Feb. 5, 1952 |
| 2,590,239 | Elsman | Mar. 25, 1952 |
| 2,593,553 | Francis | Apr. 22, 1952 |
| 2,640,799 | Grangaard | Jan. 2, 1953 |
| 2,680,468 | Lewis | June 8, 1954 |
| 2,688,356 | Conti | Sept. 7, 1954 |
| 2,707,018 | Bolton | Apr. 26, 1955 |
| 2,714,571 | Irion et al. | Aug. 2, 1955 |
| 2,726,979 | Grant | Dec. 13, 1955 |
| 2,754,883 | Secrest | July 17, 1956 |
| 2,791,529 | Converse | May 7, 1957 |
| 2,804,120 | Dancewicz | Aug. 27, 1957 |
| 2,830,926 | Bailey | Sept. 17, 1958 |
| 3,020,194 | Jerothe | Feb. 6, 1962 |